UNITED STATES PATENT OFFICE.

DANIEL LAFFAN, OF DUBLIN, IRELAND.

PRODUCTION OF MARBLED SURFACES UPON GLASS.

SPECIFICATION forming part of Letters Patent No. 654,404, dated July 24, 1900.

Application filed May 22, 1899. Serial No. 717,839. (No specimens.)

*To all whom it may concern:*

Be it known that I, DANIEL LAFFAN, a subject of the Queen of Great Britain and Ireland, residing at Dublin, in the county of Dublin, Ireland, have invented certain new and useful Improvements in the Production of Marbled Surfaces on Glass, of which the following is a specification.

This invention relates to the production of marbled surfaces on glass or the like, and has for its object to produce at a low price an imitation marble. Hitherto this marbling has generally been effected by painting with a brush and depends for its effectiveness upon the skill or talent of the operator. By my invention, however, I employ certain chemicals the use of which in the manner to be described will produce a marble surface which closely resembles natural marble and which can be done, if desired, on a full-sized sheet of glass and afterward cut up to any required size.

In carrying the invention into effect the side of the glass to be marbled is first prepared in order to resist moisture and to lessen the smoothness of the glass by washing over the surface with the following or any other suitable solution for the purpose:

The solution is prepared as follows: One gallon of boiling water, one pound resin, and two ounces ammonia boiled with two ounces concentrated or powdered size and alum. When this solution is dry on the glass, one of the colors required to be produced—say, for example, the blue—is then thrown onto the glass by a coarse brush or broom or coarse sponge or otherwise, and over same here and there another required color is thrown or distributed, a light color to be usually the last used. In order to disperse these colors, if not blending readily, and form veins and shades in imitation of marble, a mixture of two and one-half fluid ounces of spirits of turpentine to one gallon of boiling water is sprinkled on the sheet of glass, which is moved up and down to allow the colors to blend together and produce the required marbled or veined surface; but to produce patterns not requiring to have veins this turpentine can be dispensed with. The surface is then allowed to dry. A thin coating of the consistency of very thin paint of a mixture of white lead, terebene, and spirits of turpentine is then applied over the colors, and this process causes the colors to become definite, clear, and distinct in outline, and as it dries the colors are all vividly brought out. When all the required patterns are struck and perfectly dry, a thick coating of whiting and size mixed to the consistency of thick paint is brushed over the colors on the sheet of glass. The object of this coating is to secure the more delicate colors from the effect of the gas-tar referred to below, which might otherwise penetrate to them, and when dry it is finally coated over with Brunswick black or gas-tar. For use outdoors fine sand can be sieved over the tar before it hardens. This will give the slabs a tendency to bond in plaster or cement. Imitation-marble columns, pillars, &c., can be produced by this process.

To prepare the pigments, the following ingredients may be used, these receipts being given purely by way of example:

Blue may be made by dissolving two ounces of Chinese blue in one-half gallon of boiling water, two ounces size, two pounds rolled whiting or Paris white, and two ounces of oxalic acid.

Black may be prepared with one pound of lampblack, one pound drop-black, and one-half ounce indigo-blue, all to be ground together in a paint-mill, two ounces size, and one-half gallon of water.

Red may be prepared with one pound vermilion, one pound Derby red, and one ounce size to one quart of water. To this and all bright colors two and one-half fluid ounces of methylated spirit may be added.

Brown is made from Brunswick green, this pigment when calcined turning to a rich brown, and different shades can be added by adding red chalk or orange lead.

Yellow may be prepared with one ounce gamboge, one pint methylated spirit, and one pound flake-white.

In giving the above proportions and ingredients, however, I wish it to be understood that I do not confine myself thereto, as they may be varied to suit all circumstances or the peculiar requirements of each individual case. As to the substances named, any other substance producing a like result may be used.

I declare that what I claim is—

The process for producing marbled surfaces on glass, which consists in first treating the surface of the glass so as to resist moisture and lessen its smoothness, then applying the various colors consecutively (the lightest shade being applied last) by throwing them on with a brush, sponge or the like, then applying a thin coating consisting of a mixture of white lead, terebene, and spirits of turpentine to bring all the colors vividly out, and finally when dry applying thick separate coatings of whiting and size, and of Brunswick black or gas-tar, substantially as described.

In witness whereof I have hereunto signed my name this 9th day of May, 1899, in the presence of two subscribing witnesses.

DANIEL LAFFAN.

Witnesses:
ARTHUR DONN PIATT,
JOHN CROWLEY.